United States Patent [19]

Huperz et al.

[11] 4,428,275
[45] Jan. 31, 1984

[54] DEVICE FOR CONNECTING A PLUNGER AT ITS CRANK END TO A CONNECTING ROD

[75] Inventors: Adalbert Huperz, Hockenheim; Wolfgang Maasberg, Hünxe-Krudenburg, both of Fed. Rep. of Germany

[73] Assignee: Woma-Apparatebau W. Maasberg & Co. GmbH, Fed. Rep. of Germany

[21] Appl. No.: 260,218

[22] Filed: May 4, 1981

[30] Foreign Application Priority Data

May 9, 1980 [DE] Fed. Rep. of Germany ....... 3017773

[51] Int. Cl.³ ............................ F16J 1/14; F16C 9/00
[52] U.S. Cl. ...................................... 92/188; 92/248; 92/257; 403/287; 403/342; 403/370; 403/374
[58] Field of Search ............... 403/342, 374, 370, 287; 92/255, 187, 188, 248, 257, 189, 190; 173/127

[56] References Cited

U.S. PATENT DOCUMENTS 3,276,390 10/1966 Bloudoff et al. ..................... 92/255
3,670,630 6/1972 Tyson et al. ........................ 92/187
3,998,563 12/1976 Kloren ............................... 403/374
4,025,213 5/1977 Schafer et al. ..................... 403/374
4,235,573 11/1980 Peter et al. ......................... 403/370

Primary Examiner—Robert E. Garrett
Assistant Examiner—Richard L. Klein
Attorney, Agent, or Firm—McGlew and Tuttle

[57] ABSTRACT

An improved device is disclosed for connecting a plunger to a connecting rod of the type having a crosshead connected to the connecting rod, the crosshead having a coupling element with a flange and a coupling nut mounted to the flange. The coupling element is provided with a centering bore and a thrust plate is mounted to the coupling element. The thrust plate has a first side with a centering stud extended into the centering bore and an annular shoulder surrounding the centering stud seated against the flange. The thrust plate has a recess on a second side opposite the first side for receivingly centering an end of the plunger. A clamping assembly for clamping the coupling element includes a collar threadably engaged to the coupling nut.

4 Claims, 3 Drawing Figures

DEVICE FOR CONNECTING A PLUNGER AT ITS CRANK END TO A CONNECTING ROD

FIELD AND BACKGROUND OF THE INVENTION

The invention relates in general to a coupling mechanism and, more particularly, to a device, for connecting a plunger to a connecting rod, of the type in which a crosshead is connected to the connecting rod, the crosshead having a coupling element with a flange, and a coupling nut mounted to the flange.

A ceramic plunger having a central tapped hole has been used in known devices operating under high and extremely high pressure conditions. The threaded core of a multipart plunger support is screwed in this tapped hold and an adhesive lining is interposed therebetween to prevent rotation. The plunger support has a flange, non-rotatably secured to the threaded core, that is provided with an external thread for receiving a coupling nut carried on the crosshead of the associated connecting rod. In this prior art construction, the plunger support disadvantageously tends to become loosened from the plunger, which is designed as a sleeve, since the adhesive lining is not quite capable of preventing rotation. This causes disengagement between the threaded or contact surfaces of the plunger and the threaded core. Under load, such disengagements ultimately result in a destruction of the plunger. In addition, the screw connection of the threaded core within the tapped hold may easily cause cracking inside the sleeve-like plunger, due to extension forces. Also, the contact areas between the plunger and the plunger support are relatively small so that there is a risk that the ceramic plunger might break even prior to achieving rated operational load. The invention provides a remedy.

SUMMARY OF THE INVENTION

The invention is directed to a device of the above-mentioned kind which ensures that the acting forces are optimally distributed and minimum surface-contact pressures are obtained while avoiding expansion forces so that, even in operation at high and extremely high loads, the life of the plunger is extended, and further ensuring that problems do not arise when the plunger is exchanged.

In accordance with the invention, the coupling element includes a centering bore, a thrust plate mounted to the coupling element, the thrust plate having a first side with a centering stud extended into the centering bore and an annular shoulder surrounding the centering stud that is seated against the face of the flange, the thrust plate having a recess on a second side opposite the first side thereof for receivingly centering an end of the plunger, and a clamping assembly for clamping the plunger to the coupling element, the clamping assembly including a collar threadably engaged to the coupling nut. As a result, a well-defined centering of the thrust plate and, thereby, the plunger, is obtained. This advantageously results not only in minimum specific contact pressure in the thrust area of the plunger but also in a secure elimination of expansion forces within the plunger. By centering the plunger and utilizing the entire thrust area of the respective plunger end, the plunger is substantially loaded only in compression. Such loading is particularly advantageous for a plunger which is preferably designed as a solid piston provided with a high superficial hardening of ceramic, such as ceramic oxide, or a brittle metal alloy. A quite satisfactory permanent contact between the thrust face of the respective plunger end and the thrust plate is ensured by tightening the coupling nut. Actually, the invention teaches a non-positive clamping system for plungers that are composed of materials which are suitable only for taking up compressive forces and are exposed to high and extremely high loads in service, for example, pump pistons of reciprocating power pumps for high or very high pressure.

There are further features which are essential to the invention. In a preferred embodiment of the invention important in itself, it is provided that the clamping assembly includes a housing having a cylindrical bore extending therethrough, the plunger extending through said cylindrical bore, an inner clamping ring embracing the plunger within the housing, and an outer clamping ring concentrically surrounding the inner clamping ring, the inner and outer clamping ring having biconical clamping surfaces, and two cone rings mounted between the radially opposed surfaces of the inner and outer clamping rings, and clamping screws inserted between the inner and outer clamping rings for connecting the cone rings to each other. In the inventive clamping assembly, the application of the acting forces can be optimized by a clamping force which can exactly be defined to eliminate an overstressing of the plunger material. Thus, the clamping screws can be precisely tightened with a torque wrench so that the clamping assembly as a whole can be mounted externally of a high or extremely high pressure pump, to an exactly predetermined tightening torque. The external mounting, at the same time, simplifies the mounting of the plunger. Further, the inventive clamping assembly automatically compensates for unequal material expansions, because the biased cone rings and clamping rings are elastic and, for example, can take up differential thermal expansions where a compound construction of ceramic material and steel is provided. The threaded collar of the clamping assembly may engage over the thrust plate in the zone of the front face of the flange, so that a coupling well closed to the outside is obtained.

The inventive device can be advantageously employed under high or extremely high pressure conditions of high pressure pumps to prevent both the occurrence of expansion forces within a plunger and the destruction of a plunger by a too high specific contact pressure in the area of the thrust face of the plunger. This makes the inventive arrangement particularly suitable for solid piston applications, that is, solid pistons having a high superficial hardness, such as those composed of a ceramic material, as oxide ceramic, composed of a brittle metal alloy. The clamping assembly is designed so that exactly defind clamping forces can be obtained and any material overstresses are avoided. The accurate alignment and direct contact between the thrust plate and the opposing front face of the plunger insure an optimum transfer of forces at a minimum specific surface pressure.

Due to the inventive clamping assembly, problems arising during the exchange of plungers of different diameter are eliminated so that substitute sets can be readily mounted. In addition, the clamping assembly can be used repeatedly and the plunger may be designed as an easy to manufacture inexpensive wearing part, for example, as a solid piston. A connecting element is not provided within the plunger itself. An adhesive lining or other means for preventing rotation may also be omitted and the clamping of the plunger is rather non-positive, that is, is obtained without a screw connection. The plunger may thus be designed for rated pressures of 1,000 bar and greater.

Thus, it is an object of the invention, to provide an improved device for connecting a plunger to a connecting rod of the type having a crosshead connected to the connecting rod, the crosshead having a coupling element with a flange, and a coupling nut mounted to the flange, the improvement wherein the coupling element includes a centering bore, and further comprising a thrust plate mounted to the coupling element, the thrust plate having a first side with a centering stud extended into the centering bore and an annular shoulder surrounding the centering stud seated against the flange, the thrust plate having a recess on a second side opposite said first side for receivingly centering an end of the plunger, and means for clamping the plunger to the coupling element, the clamping means including a collar threadably engaged to the coupling nut.

It is a further object of the invention to provide an improved device for connecting a plunger to the connecting rod which is simple in design, easy to manufacture and economical.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings:

FIG. 1a is an enlarged detail view of a portion of FIG. 1;

DETAILED DESCRIPTION

Figure 1:
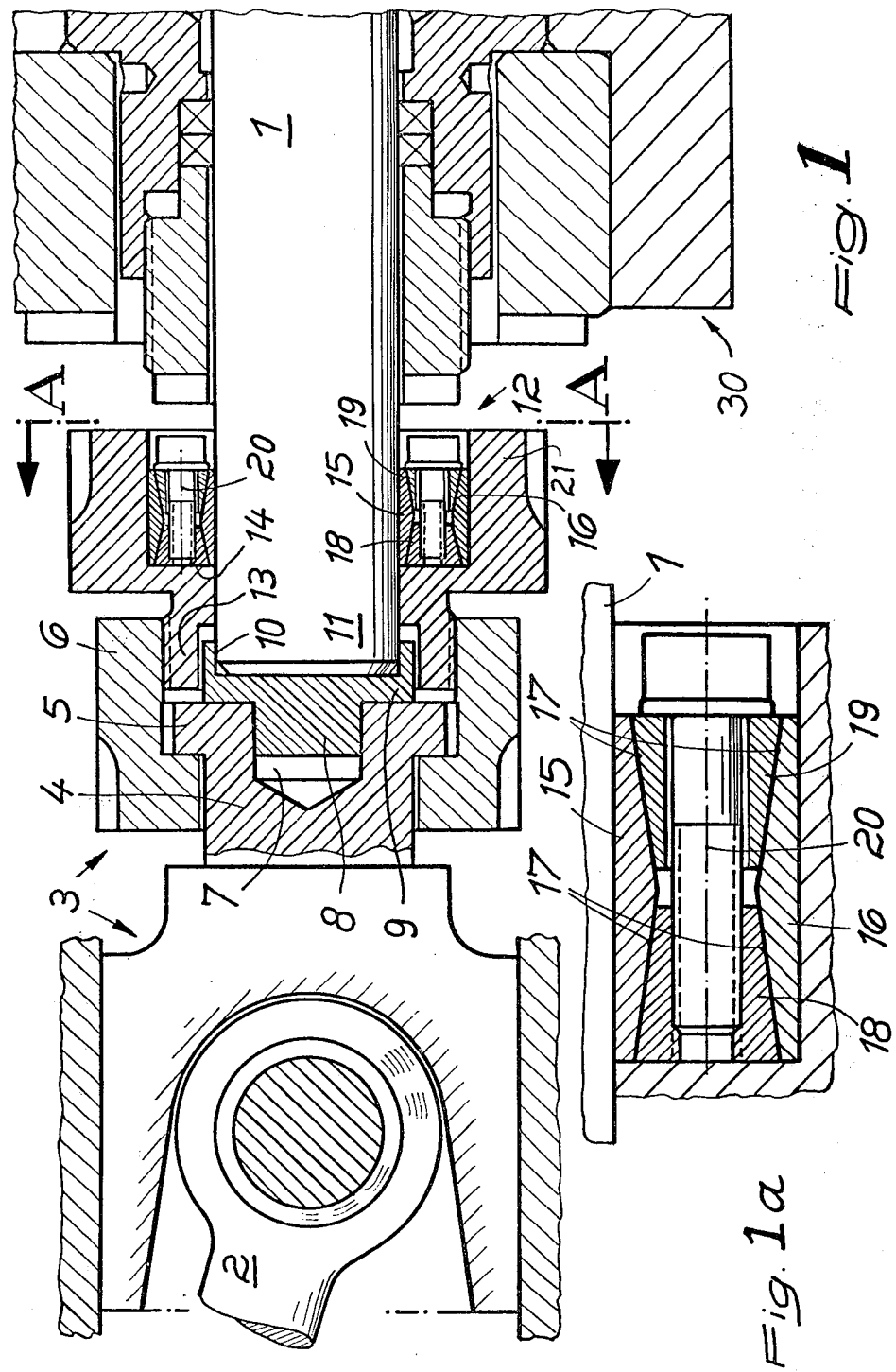
FIG. 1 is a side elevation view, partly in section, of a device according to the invention.
Figure 2:
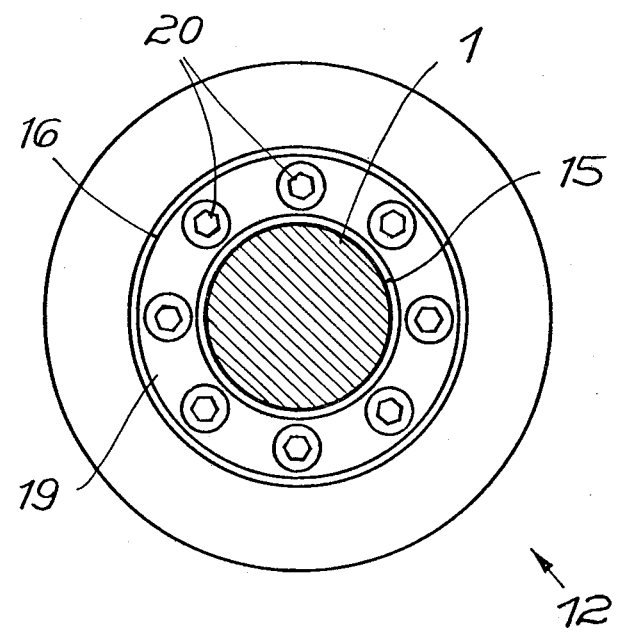
FIG. 2 is a partlial sectional view taken along the line A—A of FIG. 1.

The shown device is designed for connecting the crank side of a plunger 1 to a connecting rod 2 through an interposed crosshead 3 and a coupling element 4 having a flange 5 for mounting a coupling nut 6. The coupling element 4 has a centering bore 7 for receiving a centering stud 8 which is provided on one side of a thrust plate 9 seated against the front face of the flange 5. Thrust plate 9 is provided with a centering recess 10 on its opposite side for receiving an associated end 11 of the plunger 1. Centering bore 7 and centering recess 10 are designed as precision bores. Plunger 1 is clamped into a clamping assembly 12 in the vicinity of its end 11. The clamping assembly 12 includes a threaded collar 13. The collar 13 has an external thread onto which the coupling nut 6 is screwed. By tightening coupling nut 6 on the collar 13, a very satisfactory contact between coupling element 4, thrust plate 9 and the front face of the plunger 1, and end 11, is obtained.

Plunger 1 is designed as a solid piston having a highly hardened surface composed of a ceramic material such as ceramic oxide or of a brittle metal alloy. The cylindrical plunger may have a constant or varying diameter.

Clamping assembly 12 comprises a basic body 21 with a cylindrical bore 14 through which plunger 1 extends, an inner clamping ring 15 embracing plunger 1, and an outer clamping ring 16 concentric therewith. Both rings 15, 16 have boconical clamping surfaces 17 which are associated with each other. Two cone rings 18, 19, which are connected to each other by clamping screws 20, are inserted betweeen the radially spaced clamping rings 15, 16, or clamping surfaces 17. Threaded collar 13 of clamping assembly 12 engages over thrust plate 9 in the zone of the front face of flange 5.

The figures show clearly that clamping assembly 12 for plunger 1 can be mounted externally of the high or extremely high pressure pump, generally designated by reference numerals 30, by means of a torque wrench, while taking into account a definite tightening torque which is to be exactly observed. In addition, a well-defined centering of plunger 1 in thrust plate 9 is obtained by tightening coupling nut 6. In principle, a differently designed clamplling assembly 12 may also be used.

Thus, in accordance with the invention, there is provided a device for connecting a plunger at its crank end to a connecting rod, with the interposition of a crosshead and a coupling element having a flange for a coupling nut, characterized in that the coupling element 4 has a centering bore 7 for receiving a centering stud 8 which is provided on a thrust plate 9 applying against the front face of the flange, and the thrust plate 9 has a centering recess 10 for receiving the associated end 11 of the plunger, and that in the zone of its end portion 11, the plunger 1 is clamped into a clamping assembly 12 which is provided with a threaded collar 13 to be engaged by the coupling nut. The plunger 1 is preferably designed as a solid piston with a high surface hardening of ceramic, for example ceramic oxide, or a brittle metal alloy.

The preferred clamping assembly 12 comprises a basic part having a cylindrical bore 14 through which the plunger 1 extends, an inner clamping ring 15 embracing the plunger 1, and an outer clamping ring 16 concentrically disposed therewith, both rings having biconical clamping surfaces 17 associated with each other, with two cone rings 18, 19 and clamping screws 20 connecting the cone rings being inserted between the two clamping rings 15, 16.

In the zone of the front face of the flange, the threaded collar 13 of the basic body or housing of the clamping assembly 12 engages over the thrust plate 9.

While a specific embodiment of the invention has been shown and described in detail to illustrate the application of the principles of the invention, it will be understood that the invention may be embodied otherwise without departing from such principles.

What is claimed is:

1. In a device for connecting a plunger having high surface hardness and made of ceramic material, to a connecting rod, the crosshead having a coupling element with a flange, and a coupling nut mounted to the flange, the improvement wherein the coupling element (4) includes a centering bore (7) and a shoulder engaged with the coupling nut (6), and further comprising a thrust plate (9) mounted to the coupling element, said thrust plate having a first side with a centering stud (8) extended into said centering bore and an annular shoulder surrounding said centering stud seated against the flange (5), said thrust plate having a centering recess (10) on a second side opposite said first side for receivingly centering an end (11) of the plunger (1), a collar (13) threadably engaged to the coupling nut (6) and having a cylindrical recess therein through which the plunger extends, said collar engaged over said thrust plate at an end of said thrust plate on said second side thereof and clamping means connected to the plunger and disposed in said cylindrical recess for clamping the plunger to said collar.

2. The improved device as set forth in claim 1, wherein said ceramic hardening material comprises a ceramic oxide.

3. In a device for connecting a plunger having high surface hardness to a connecting rod of the type having a crosshead connected to the connecting rod, the crosshead having a coupling element with a flange, and a coupling nut mounted to the flange, the improvement wherein the coupling element includes a centering bore, and further comprising a thrust plate mounted to the coupling element, said thrust plate having a first side with a centering stud extended into said centering bore and an annular shoulder surrounding said centering stud seated against the flange, said thrust plate having a centering recess on a second side opposite said first side for receivingly centering an end of the plunger, a collar threadably engaged to the coupling nut and having a cylindrical recess therein through which the plunger extends, said collar radially overlying said thrust plate, an inner clamping ring embracing the plunger within said cylindrical recess, an outer clamping ring concentrically surrounding said inner clamping ring, said inner and said outer clamping rings having biconical clamping surfaces, upper and lower cone rings mounted between the radially opposed surfaces of said inner and said outer clamping rings, and clamping screws connected between said upper and lower cone rings for connecting said cone rings.

4. The improved device as set forth in claim 3, wherein the plunger is a solid piston composed of a brittle metal alloy.

* * * * *